(12) United States Patent
Maiman et al.

(10) Patent No.: US 12,293,350 B1
(45) Date of Patent: May 6, 2025

(54) TRANSACTION CARD WITH A REMOVABLE MAGNETIC STRIP

(71) Applicant: Capital One Services, LLC, McLean, VA (US)

(72) Inventors: Tyler Maiman, Melville, NY (US); Joshua Edwards, Philadelphia, PA (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/502,873

(22) Filed: Nov. 6, 2023

(51) Int. Cl.
*G06Q 20/34* (2012.01)

(52) U.S. Cl.
CPC .................................. *G06Q 20/347* (2013.01)

(58) Field of Classification Search
CPC .................................................... G06Q 20/347
USPC ................................................. 235/380, 493
See application file for complete search history.

(56) References Cited

U.S. PATENT DOCUMENTS

| | | | |
|---|---|---|---|
| 5,255,941 A | 7/1993 | Saito et al. | |
| 5,818,030 A * | 10/1998 | Reyes | G06K 19/077 |
| | | | 235/487 |
| 6,196,594 B1 | 3/2001 | Keller | |
| 10,614,449 B1 * | 4/2020 | Pham | G06K 19/07737 |
| 11,034,181 B2 * | 6/2021 | Herrington | B42D 25/373 |
| 11,132,592 B1 * | 9/2021 | Maiman | G06K 19/07773 |
| 2014/0084059 A1 * | 3/2014 | Sierchio | G06K 19/0719 |
| | | | 235/492 |
| 2021/0406635 A1 | 12/2021 | Johnson et al. | |

* cited by examiner

*Primary Examiner* — Paultep Savusdiphol
(74) *Attorney, Agent, or Firm* — Bookoff McAndrews, PLLC

(57) ABSTRACT

A transaction card assembly may include a card body comprising a first face and a second face opposite the first face; a receiving portion formed on the first face of the card body; and a first removable magnetic strip assembly comprising a first magnetic strip and a first attachment portion. In a first configuration, the first removable magnetic strip assembly may be coupled to the card body via engagement between the first attachment portion and the first magnetic strip, and in a second configuration, the first removable magnetic strip assembly may be uncoupled from the card body by disengagement between the first attachment portion and the first magnetic strip. In the second configuration, the first removable magnetic strip assembly is configured for reuse with an additional card body, the additional card body being different than the card body.

20 Claims, 5 Drawing Sheets

TRANSACTION CARD WITH A REMOVABLE MAGNETIC STRIP

TECHNICAL FIELD

Various embodiments of the present disclosure relate generally to payment or other transaction cards and, more particularly, to transaction cards having a a removable and replaceable magnetic strip assembly.

BACKGROUND

Transaction cards often comprise a card body upon or inside of which are disposed elements for completing transactions or otherwise providing cardholder information, such as a magnetic strip, a Europay, Mastercard, and Visa (EMV) chip, a radio frequency identification (RFID) chip, an antenna, and printed or otherwise displayed visible cardholder information, such as the cardholder name, transaction card number, transaction card expiration date, cardholder signature panel, and other information specific to the cardholder. Cardholders often have an interest in personalizing the card body associated with their transaction cards, in addition to an interest in securely disposing of expired or unwanted cards, and reducing the amount of waste associated with the disposing of expired or unwanted transaction cards.

In view of these and other deficiencies in existing techniques, solutions are needed for reducing waste of card bodies and allowing users more freedom in personalizing their transaction cards. The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, payment, transaction, or other cards having a removable magnetic strip assembly and related methods are disclosed. The disclosed embodiments may provide a cardholder with cards that may be securely disposed of with reduced waste, and provide options for personalization of their cards.

For instance, a transaction card assembly may include: a card body comprising a first face and a second face opposite the first face; a receiving portion formed on the first face of the card body; and a first removable magnetic strip assembly comprising a first magnetic strip and a first attachment portion; wherein, in a first configuration, the first removable magnetic strip assembly is coupled to the card body via engagement between the first attachment portion and the first magnetic strip, and in a second configuration, the first removable magnetic strip assembly is uncoupled from the card body by disengagement between the first attachment portion and the first magnetic strip, and wherein, in the second configuration, the first removable magnetic strip assembly is configured for reuse with an additional card body, the additional card body being different than the card body.

In another example, a removable magnetic strip assembly for transaction cards may include: a reusable magnetic strip; and an attachment portion configured to be attachable to a plurality of card bodies; wherein the removable magnetic strip assembly is configured to be selectively attached to or removed from a first card body of the plurality of card bodies by selectively engaging the attachment portion to a first receiving portion of the first card body or disengaging the attachment portion from the first receiving portion of the first card body, respectively.

In a further example, a method may include: uncoupling a first removable magnetic strip assembly from a first card body having a first receiving portion, the first removable magnetic strip assembly including a first magnetic strip, a first attachment portion, and a first visible cardholder information printed on the first magnetic strip, wherein upon uncoupling of the first removable magnetic strip assembly, the first card body is disabled from active use as tender; and coupling the first removable magnetic strip assembly to a second card body such that, when coupled to the second card body, the second card body is enabled for active use as tender.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of +10% of a stated or understood value.

In general, the present disclosure is directed to payment, transaction, or other cards and, more particularly, to transaction card assemblies having a removable and replaceable card body and removable and replaceable magnetic strip assembly. Cardholders may need to dispose of transaction cards, often when the transaction card has expired or been deactivated (e.g., due to potential fraudulent activity) and a replacement has arrived, or other times because the cardholder has chosen to personalize an image on the card body, thus replacing an unused card with a new personalized card. When transaction cards are disposed of, the information available on the cards may pose a security risk to the cardholder.

Cardholders are often encouraged to destroy transaction cards when disposing of them, or to mail them back to the card issuer to be destroyed. However, cardholders may find the task of destroying a card cumbersome and/or find the task of mailing a card back to the issuer difficult to remember. As such, it may be common for cardholders to dispose of unused cards in a manner that is less secure, such as by depositing the unused or expired cards into a home, office, or even public recycling bin or trash receptacle. As such, there is an interest in making disposal of canceled, unused, or expired transaction card information easier and more secure.

FIGS. 1A-1D depict an exemplary transaction card assembly 100 and components thereof, consistent with one or more embodiments of the present disclosure. Transaction card assembly 100 may be any physical card product configured to store information, such as financial information (e.g., card numbers, account numbers, etc.), quasi-financial information (e.g., rewards balance, discount information, etc.), information pertaining to a transaction (e.g., transaction status, transaction amount, etc.) and/or individual-identifying information (e.g., name, address, etc.). Examples of transaction card assemblies include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Accordingly, the term "transaction" should be construed broadly to include any presentation or transfer of information associated with the transaction card.

Figure 1A:
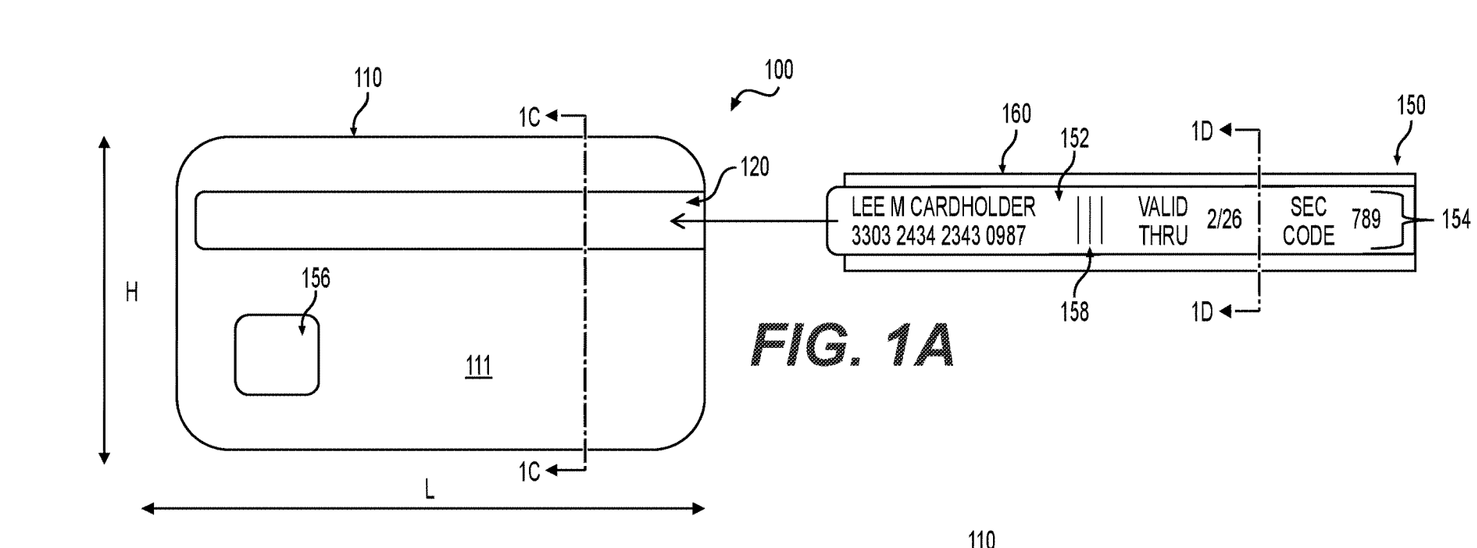
FIG. 1A depicts an exemplary transaction card assembly in an uncoupled configuration, consistent with one or more embodiments of the present disclosure.

FIG. 1A shows a transaction card assembly 100 including a card body 110 and a magnetic strip assembly 150 in a configuration in which the magnetic strip assembly 150 is uncoupled from the card body 110. The magnetic strip assembly 150 is removable and replaceable from the card body 110 via engagement and disengagement of a receiving portion 120 of the card body 110 and an attachment portion 160 of the magnetic strip assembly 150. In the exemplary embodiment shown in FIGS. 1A-1D and described in further detail below, the attachment portion 160 of the magnetic strip assembly 150 may be a track 1601 that is received in a groove 1202 of the receiving portion 120 of the card body 110. Other modes of engagement between the attachment portion 160 and the receiving portion 120 are described in more detail with reference to FIGS. 3A-3E below.

In some examples, magnetic strip assembly 150 may be associated with a cardholder account that may be expired or otherwise have outdated information. For example, the expiration date may have lapsed or the card number may have been compromised such that there is a fraud alert on the card and the cardholder is awaiting or has received a new card number.

Conventionally, in such situations as described with respect to magnetic strip assembly 150 where the information associated with the transaction card assembly 100 becomes outdated, a cardholder may be required to dispose of and/or destroy the entire transaction card assembly 100 comprising the card body 110 and the magnetic strip assembly 150. However, in the example shown in FIG. 1A, magnetic strip assembly 150 may be removed from card body 110, and independently destroyed, such that the entire transaction card assembly 100 and particularly card body 110 need not be destroyed.

This is possible because the magnetic strip assembly 150 may include all or substantially all of the cardholder information associated with the transaction card assembly 100. For example, in addition to account information encoded on a magnetic strip 152 of the magnetic strip assembly 150, the magnetic strip assembly 150 may further include cardholder information 154 printed thereon. The cardholder information 154 may include a cardholder name, a transaction card number, a transaction card expiration date, and/or a card verification value (CVV), among other information. Additionally, the card assembly may include an EMV chip, and the EMV chip may be separately removable and replaceable from an EMV chip receptacle 156. As such, the cardholder does not need to dispose of or destroy the entire transaction card assembly 100, but may reuse the card body 110 and dispose only of the magnetic strip assembly 150 after removing it from the card body 110.

Figure 1B:
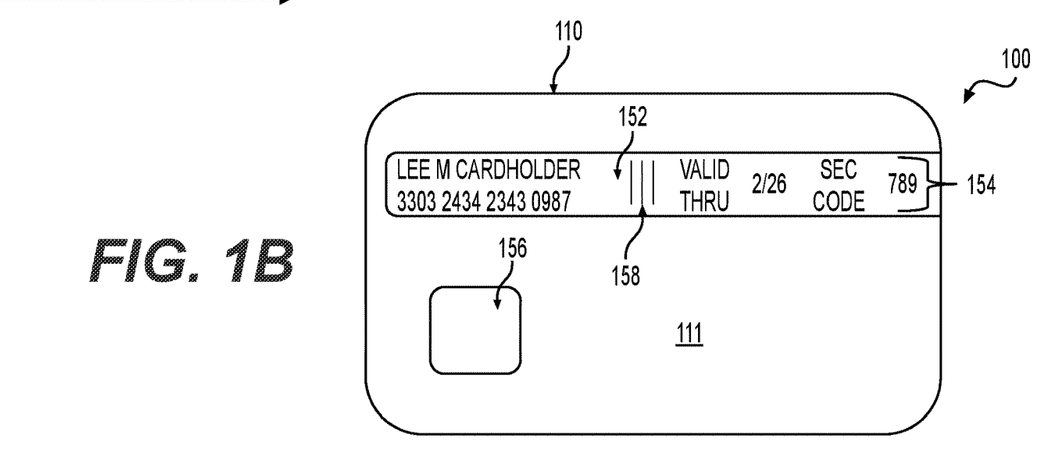
FIG. 1B depicts an exemplary transaction card assembly in a coupled configuration, consistent with one or more embodiments of the present disclosure.

FIGS. 1A and 1B demonstrate the transaction card assembly 100 in two configurations: a coupled configuration in FIG. 1B in which the magnetic strip assembly 150 is coupled to the card body 110 via engagement between the receiving portion 120 of the card body 110 and the attachment portion 160 of the magnetic strip assembly 150; and an uncoupled configuration in FIG. 1A in which the magnetic strip assembly 150 is uncoupled from the card body 110 via disengagement of the receiving portion 120 of the card body 110 from the attachment portion 160 of the magnetic strip assembly 150.

The card body 110 is substantially rectangular with a height H extending in a vertical direction and a length L extending in a horizontal direction substantially perpendicular to the vertical direction. The receiving portion 120 may be formed on a first face 111 of the card body 110 and may comprise a groove 1202 (see FIG. 1C) extending in the horizontal direction, wherein the length of the groove 1202 in the horizontal direction may be equal to or, as shown in FIGS. 1A-1B, less than the length L of the card body 110 in the horizontal direction. In some embodiments, the groove 1202 may be formed in a substantially vertical direction perpendicular to the horizontal direction described. In such embodiments, the length of the groove 1202 in the vertical direction may be substantially equal to or less than the height H of the card body 110 in the vertical direction.

When disengaged from the card body 110, the magnetic strip assembly 150 is removed along with any cardholder information encoded on the magnetic strip 152 and any cardholder information 154 printed on the magnetic strip 152. The magnetic strip assembly 150 may be configured for reuse with an additional card body, such as card body 110B using attachment portion 160 described with reference to FIG. 2 below.

Figure 1C:
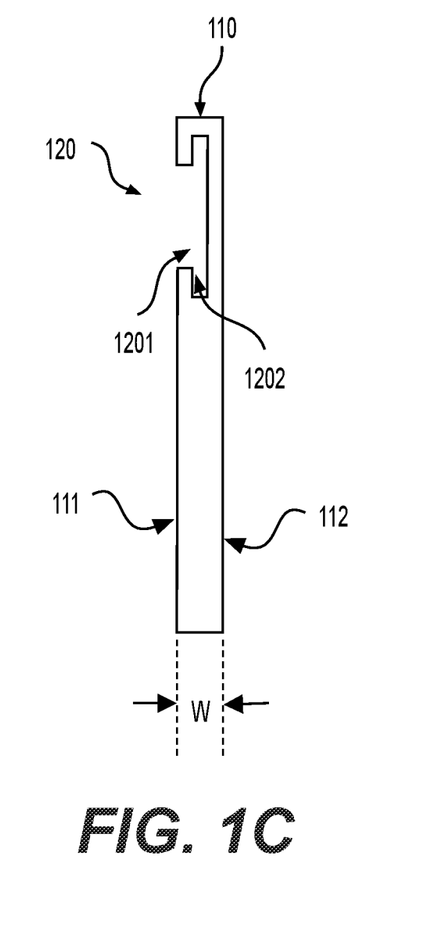
FIG. 1C depicts a cross sectional view of a card body in an uncoupled configuration taken along line 1C-1C in FIG. 1A, consistent with one or more embodiments of the present disclosure.
Figure 1D:
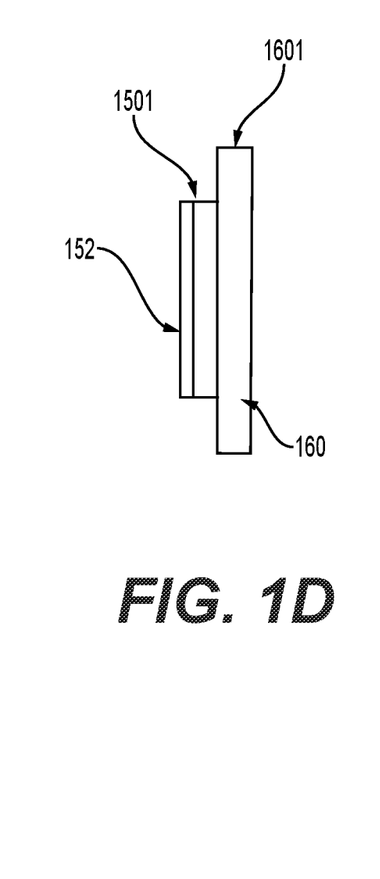
FIG. 1D depicts a cross sectional view of a magnetic strip assembly in an uncoupled configuration taken along line 1D-1D in FIG. 1A, consistent with one or more embodiments of the present disclosure.

FIG. 1C depicts a cross-sectional view of the card body 110 in the uncoupled configuration, in which the magnetic strip assembly 150 is not coupled to the card body 110. The card body 110 includes the first face 111 having a height H and length L and a second face 112 opposite the first face 111 having substantially the same height H and the same length L. The card body 110 further includes a width W extending in a third direction shown in FIG. 1C that is perpendicular to the vertical direction and horizontal direction shown in FIG. 1A. The receiving portion 120 may have a depth in the third direction that is less than the width W of the card body 110. In other words, in at least some embodiments, the groove portion is formed in the first face 111 of the card body but does not extend to the second face 112 of the card body to form a hole through the card body 110. The receiving portion 120 may alternatively be formed in the second face 112 of the card body, but formed so as not to extend to the first face 111 of the card body. In common parlance, the receiving portion 120 may be formed on the front or the back of the card body 110.

The attachment portion 160 of the magnetic strip assembly 150 may be formed as a track 1601 that comprises a protruded portion that extends outward from a body portion 1501 of the magnetic strip assembly, with the track 1601 received in the groove 1202 of the card body 110. This allows for attachment portion 160 of the magnetic strip assembly 150 to be inserted into the receiving portion 120 of the card body 110 by inserting the track 1601 into the groove 1202 and slidably positioning the magnetic strip assembly 150 into configuration for use. The track 1601 may be sized to be substantially the same length as the groove 1202 in the horizontal direction to facilitate this insertion and engagement process. To aid a cardholder in sliding the magnetic strip assembly 150 into and out of engagement with the card body 110, a tactile grip portion 158 may be provided on the magnetic strip 152. The tactile grip portion 158 may be comprised of, for example, one or more portions extruded outward from the magnetic strip 152 to form one or more extensions thereof, or one or more portions cut away from the magnetic strip 152. Extruded portions may be of the same material as the magnetic strip 152 or of a different material, and the number and size of the portions may be chosen to be sized to a cardholder's finger or thumb.

The receiving portion 120 may comprise a first portion 1201 and a groove 1202, with the groove 1202 wider than the first portion in the vertical direction. The first portion may be, for example, of the same dimensions as the body portion 1501 of the magnetic strip assembly 150, while the groove 1202 may be sized to receive the track 1601 of the attachment portion 160 of the magnetic strip assembly 150.

Even if the cardholder is not replacing an expired or canceled transaction card, there may be instances where the cardholder would be interested in using the same card body 110 with a new or different magnetic strip assembly 150. In some embodiments, the card body 110 may be personalized. Examples of personalization for the card body 110 may include graphics or images chosen by the cardholder, whether from options provided by an issuer and printed onto the card body 110, or a photograph or image provided by the cardholder and printed onto the card body 110. In at least such instances, a cardholder may be interested in using the same personalized card body 110 with one or more magnetic strip assemblies 150. For example, a cardholder may attach a second magnetic strip assembly 150B (e.g., a magnetic strip assembly different than a first magnetic strip assembly 150A) to a first card body 110A when desiring to use the debit card account, and may remove second magnetic strip assembly 150B from first card body 110A and attach third magnetic strip assembly 150C to first card body 110A when desiring to use the credit card account, as explained in further detail with respect to FIG. 2.

Figure 2:
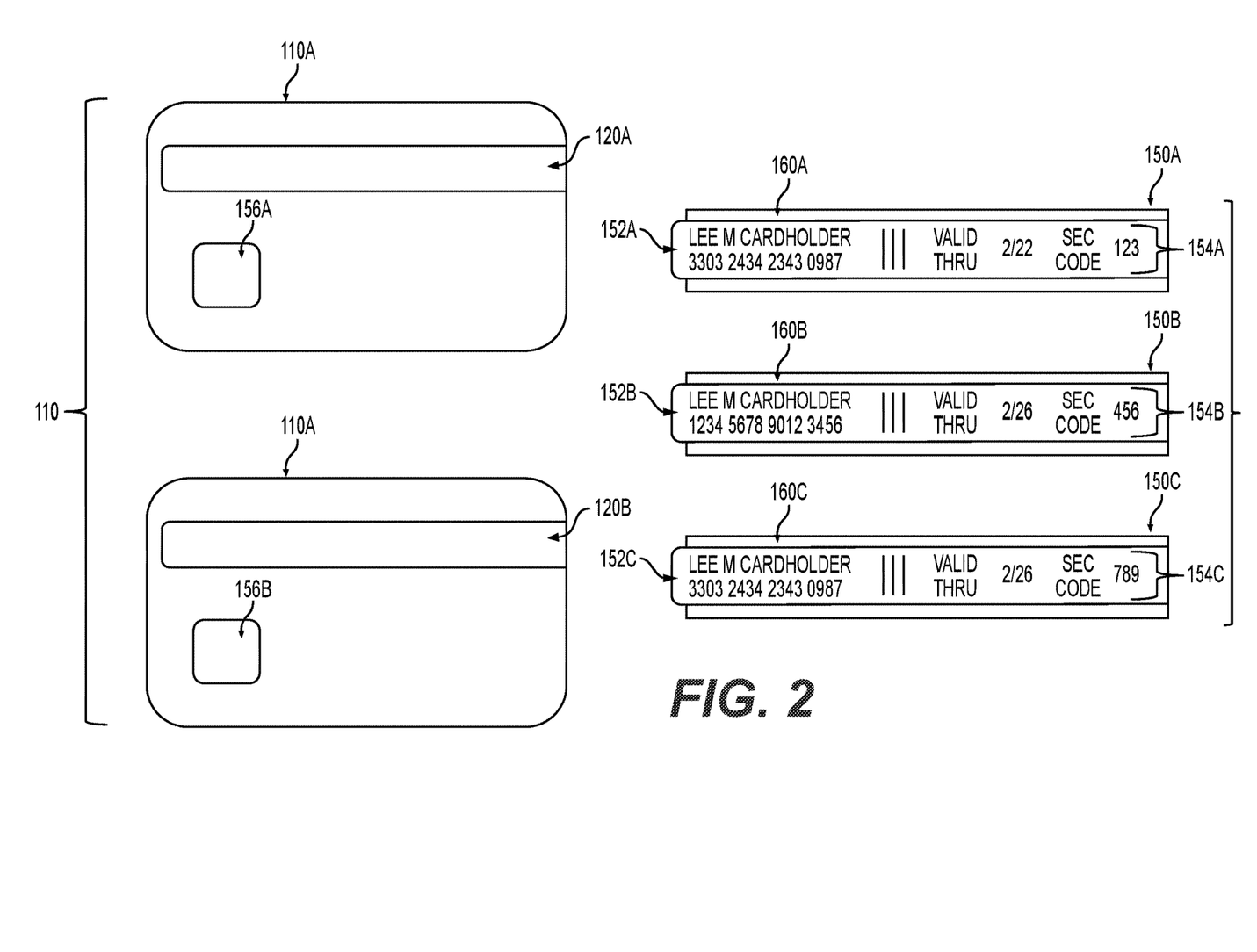
FIG. 2 depicts a plurality of card bodies and magnetic strip assemblies, consistent with one or more embodiments of the present disclosure.

FIG. 2 shows transaction card assembly components including a first card body 110A, and a second card body 110B and a plurality of magnetic strip assemblies 150A-C. In the example shown in FIG. 2, there are three magnetic strip assemblies 150A, 150B, and 150C that may selectively be attached to or removed from the card bodies. Each of the magnetic strip assemblies 150A-C are removable and replaceable from the first card body 110A and the second card body 110B such that only one of the magnetic strip assemblies 150A-C is attached to the first card body 110A and/or the second card body 110B at any given time, respectively, and each of the magnetic strip assemblies are thus reusable. Upon coupling a respective magnetic strip assembly to the card bodies, the respective magnetic strip assembly enables the card bodies for active use as tender. Upon uncoupling a magnetic strip assembly from the card bodies, the card bodies may be disabled from active use as tender.

In some examples, each magnetic strip assembly 150A-C may be associated with a different account and/or include different cardholder information. While three magnetic strip assemblies 150A-C are shown and two card bodies 110A, 110B are shown in the exemplary embodiment, there is no limit to the number of magnetic strip assemblies and card bodies that may be used to mix and match magnetic strip assemblies and card bodies, as described below.

For example, magnetic strip assembly 150A may be associated with a credit account with cardholder information 154A, magnetic strip assembly 150B may be associated with a checking account with cardholder information 154B, and magnetic strip assembly 150C may be associated with the same credit account as magnetic strip assembly 150A, but includes different cardholder information 154C such as an updated expiration date and new security code, such as would be the case if the information on magnetic strip assembly 150A had expired, or an updated credit card number in such cases as there was a potential fraud alert associated with the number on magnetic strip assembly 150A. Each of magnetic strip assemblies 150A-C include substantially similar magnetic strips 152A, 152B, and 152C.

Conventionally, in such situations as described with respect to magnetic strip assembly 150A where the information associated with the transaction card assembly 100 becomes outdated, a cardholder may be required to dispose of and/or destroy the entire transaction card assembly 100 comprising first card body 110 and magnetic strip assembly 150A. However, in the example shown in FIG. 2, magnetic strip assembly 150A may be removed from first card body 110A, and may be replaced by magnetic strip assembly 150C, such that the entire transaction card assembly 100 and particularly first card body 110A need not be destroyed.

Even if the cardholder is not replacing an expired or canceled transaction card, there may be instances where the cardholder would be interested in using the same card body 110 with multiple magnetic strip assemblies 150. In some embodiments, the card body 110 may be personalized. Examples of personalization for the card body 110 may include graphics or images chosen by the cardholder, whether from options provided by an issuer and printed onto the card body 110, or a photograph or image provided by the cardholder and printed onto the card body 110. In at least such instances, a cardholder may be interested in using the same personalized card body 110 with one or more magnetic strip assemblies 150. For example, a cardholder may attach magnetic strip assembly 150B to first card body 110A when desiring to use the debit card account, and may remove magnetic strip assembly 150B from first card body 110A and attach magnetic strip assembly 150C to first card body 110A when desiring to use the credit card account.

The card bodies 110A and 110B may be, in another example, a generic card body 110A provided by an issuer of transaction cards, and a personalized card body 110B chosen by the cardholder. In this example, a cardholder may elect to dispose of the first card body 110A and keep only the personalized card body 110B. In one example, magnetic strip assembly 150A may be attached to first card body 110A when the cardholder receives the transaction card assembly. However, a cardholder may then decide to use the personalized second card body 110B instead of the generic first card body 110A. The cardholder may detach the magnetic strip assembly 150A from the first card body 110A by disengaging the attachment portion 160A of the first magnetic strip assembly 150A from the receiving portion 120A of the first card body 110A. After the magnetic strip assembly 150A is removed from the first card body 110A, it may be placed on second card body 110B by engaging the attachment portion 160A of the first magnetic strip assembly 150A to the receiving portion 120B of the first card body 110B.

If the cardholder so chooses, the first card body 110A may then be disposed of without regard for the first card body 110A including any substantial cardholder information that could cause a security concern, as all or substantially all of the cardholder information 154A is contained on and removed with the magnetic strip assembly 150A. Additionally, an EMV chip, RFID chip and/or antenna may also be removable from the first card body 110A before disposal and replaced onto the second card body 110B.

The cardholder may also choose to retain first card body 110A and attach a second magnetic strip assembly 150B to the first card body 110A, and optionally later to remove the second magnetic strip assembly 150B from the first card body 110A and attach a third magnetic strip assembly 150C to the first card body 110, and then remove first magnetic strip assembly 150A from the second card body 110B and attach second magnetic strip assembly 150B to the second card body 110B instead. In other words, each of the magnetic strip assemblies 150A-C are removable from the card bodies 110A, 110B and configured for reuse with additional card bodies different from the card body they were removed from, and each of the card bodies are likewise removable from the magnetic strip assemblies and configured for reuse with additional magnetic strip assemblies different from the magnetic strip assembly they were removed from. Each of the card bodies 110A and 110B may include substantially similar receiving portions 120A, 120B formed on their respective first faces 111A and 111B, and each of the magnetic strip assemblies 150A-C may include substantially similar attachment portions 160A, 160B, and 160C for being received in the receiving portions. The magnetic strip assembly 150 may be held in place by a friction fit between the attachment portion 160 and the receiving portion 120, or may use a magnetic insert to help keep the assembly in place, as will be described in more detail with respect to FIG. 3.

The attachment portion 160 is described as a track 1601 being inserted into a groove 1202 of a receiving portion with reference to FIGS. 1A-1D. However, other attachment portions and receiving portions may be used to attach the magnetic strip assemblies 150A-C to the card bodies 110A, 110B, as will be described with reference to FIGS. 3A-3C.

Figure 3A:
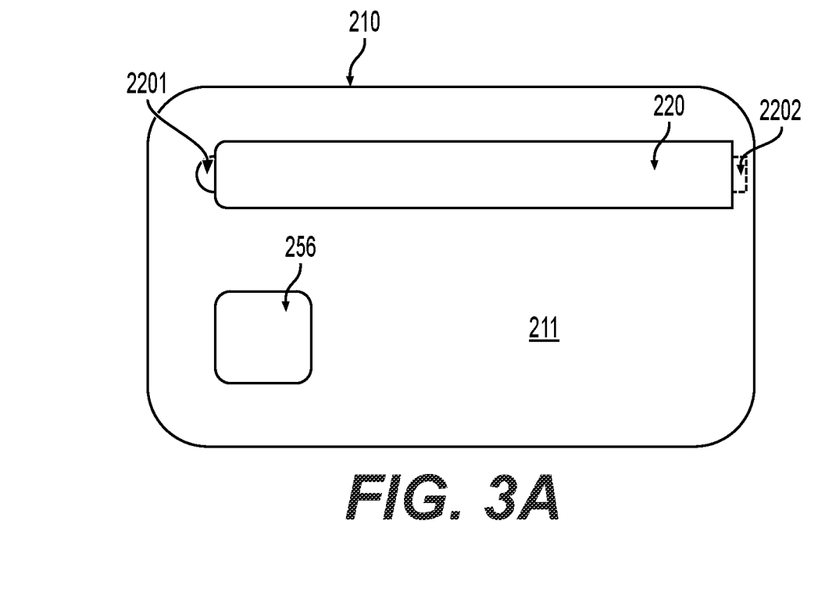
FIG. 3A depicts an exemplary card body in an uncoupled configuration, consistent with one or more embodiments of the present disclosure.
Figure 3B:
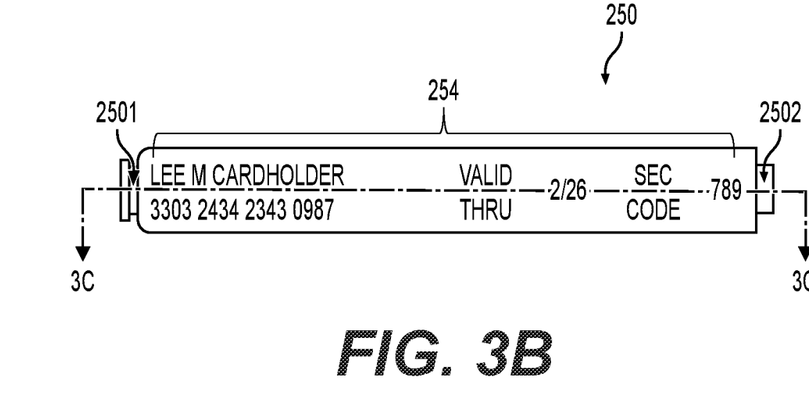
FIG. 3B depicts an exemplary magnetic strip assembly in an uncoupled configuration, consistent with one or more embodiments of the present disclosure.
Figure 3C:
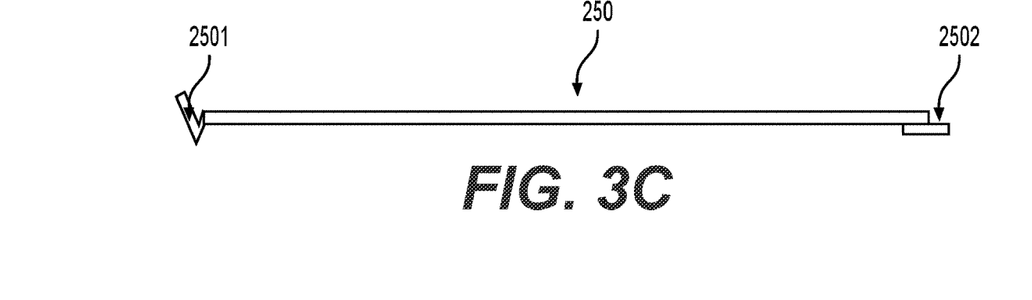
FIG. 3C depicts a cross sectional view of a magnetic strip assembly in an uncoupled configuration taken along line 3C-3C in FIG. 3B.
Figure 3D:
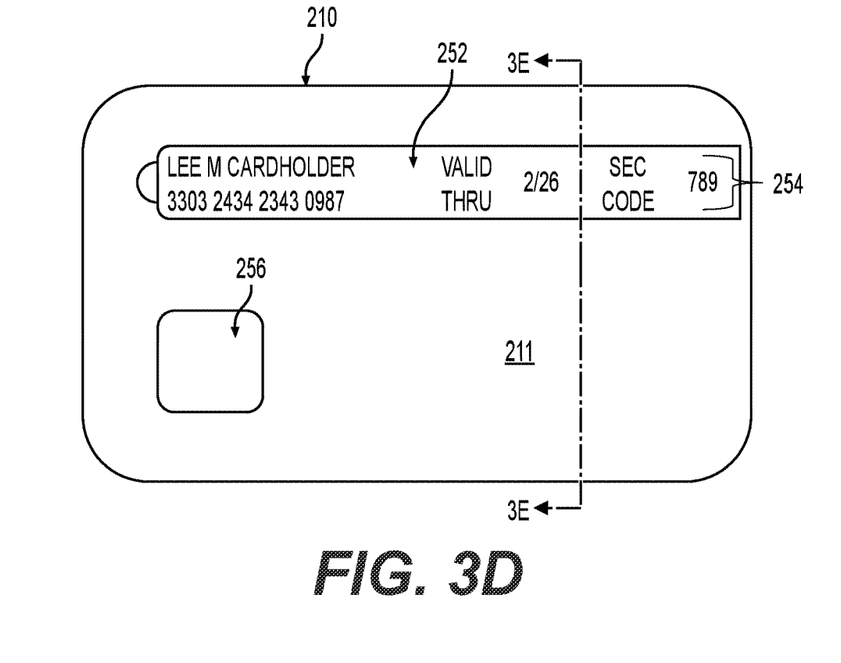
FIG. 3D depicts an exemplary transaction card assembly in a coupled configuration, consistent with one or more embodiments of the present disclosure.

FIGS. 3A-3C illustrate an additional embodiment of the present disclosure, including a card body 210 and magnetic strip assembly 250 in which a snap and clasp attachment may be employed. In the example card body 210 shown in FIG. 3A, the card body 210 is substantially similar to the card body 110 described with reference to FIGS. 1A, 1B, and 2, with a front face 211, back face 212, an EMV receptacle 256, and a receiving portion 220. The magnetic strip assembly 250 is substantially similar to the magnetic strip assembly 150, with a magnetic strip 252 and visible cardholder information 254 printed thereon. However, instead of a groove 1202, the receiving portion 220 of card body 210 includes a clasp cut-out 2201 and a snap insert 2202.

The clasp cut-out 2201 may be sized to receive clasp 2501 of magnetic strip assembly 250 (see FIG. 3B) and to provide space for a cardholder to insert a thumb or finger or other device to remove the clasp, and the snap insert 2202 may be sized to receive a snap 2502 of magnetic strip assembly 250. Multiple card bodies 210 may be formed with the receiving portion 220 and multiple magnetic strip assemblies 250 may be formed with the attachment portion comprising clasp 2501 and snap 2502, such that the magnetic strip assemblies 250 may be removable and replaceable from card bodies 210 in substantially the same manner as described in FIG. 2.

Figure 3E:
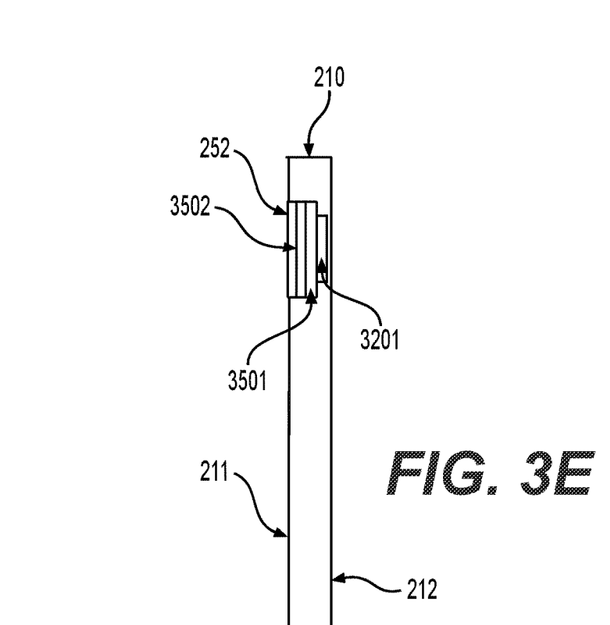
FIG. 3E depicts a cross sectional view of a transaction card assembly in a coupled configuration taken along line 3E-3E in FIG. 3D, consistent with one or more embodiments of the present disclosure.

In another example shown in FIG. 3E, the magnetic strip assembly 250 may be attached to the card body 210 by magnetic engagement. The card body 210 may include one or magnets 3201 embedded in the card body 210, and the magnetic strip assembly 250 may include multiple layers, with a first ferromagnetic layer 3501 comprised at least in part of ferromagnetic materials attracted to the one or more magnets 3201, a second layer 3502 forming a magnetic shield between the first ferromagnetic layer and a third layer that is comprised of magnetic strip 252 of the magnetic strip assembly 250.

The magnetic attachment may be used as the primary or sole mode of attachment, or they may be combined with either the mode of attachment shown in FIG. 1A-1D or the mode of attachment (snap and clasp) shown in FIGS. 3A-3C. Other modes of attachment may also be employed, such as adhesive tape or hook and loop connections.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. In the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A transaction card assembly, comprising:
    a card body comprising a first face and a second face opposite the first face;
    a receiving portion formed on the first face of the card body; and
    a first removable magnetic strip assembly comprising a first magnetic strip and a first attachment portion, first visible cardholder information printed on the first magnetic strip;
    wherein, in a first configuration, the first removable magnetic strip assembly is coupled to the card body via engagement between the first attachment portion and the first magnetic strip, and in a second configuration, the first removable magnetic strip assembly is uncoupled from the card body by disengagement between the first attachment portion and the first magnetic strip, and
    wherein, in the second configuration, the first removable magnetic strip assembly is configured for reuse with an additional card body, the additional card body being different than the card body.

2. The transaction card assembly of claim 1, wherein the card body is substantially rectangular with a height extending in a vertical direction and a length extending in a horizontal direction perpendicular to the vertical direction and further including a width extending in a third direction perpendicular to the vertical direction and the horizontal direction, and wherein
    the receiving portion formed on the first face of the card body comprises a groove extending in the horizontal direction and having a depth in the third direction that is less than the width of the card body extending in the third direction.

3. The transaction card assembly of claim 2, wherein the first attachment portion of the first removable magnetic strip assembly includes a track portion configured to be inserted into the groove of the receiving portion.

4. The transaction card assembly of claim 2, wherein the first attachment portion of the first removable magnetic strip assembly includes a snap and a clasp configured to be inserted into the groove of the receiving portion.

5. The transaction card assembly of claim 2, wherein a length of the groove in the horizontal direction is equal to or less than the length of the card body in the horizontal direction.

6. The transaction card assembly of claim 5, wherein the length of the groove in the horizontal direction is less than the length of the card body in the horizontal direction.

7. The transaction card assembly of claim 1, wherein, in the second configuration, the first visible cardholder information printed on the first magnetic strip is removed from the card body.

8. The transaction card assembly of claim 1, further comprising a second removable magnetic strip assembly comprising a second magnetic strip and a second attachment portion;
    wherein the second removable magnetic strip assembly is selectively attached to or removed from the card body by selectively engaging the second attachment portion to the receiving portion or disengaging the second attachment portion from the receiving portion.

9. The transaction card assembly of claim 8, wherein
    second visible cardholder information is printed on the second magnetic strip and is removed from the card body when the second magnetic strip is removed from the card body, and
    the first visible cardholder information is different from the second visible cardholder information.

10. A removable magnetic strip assembly for transaction cards, comprising:
    a reusable magnetic strip comprising a tactile grip portion comprising one or more extension portions extruded from the magnetic strip; and
    an attachment portion configured to be attachable to a plurality of card bodies; wherein
    the removable magnetic strip assembly is configured to be selectively attached to or removed from a first card body of the plurality of card bodies by selectively engaging the attachment portion to a first receiving portion of the first card body or disengaging the attachment portion from the first receiving portion of the first card body, respectively.

11. The removable magnetic strip assembly of claim 10, wherein the removable magnetic strip assembly is configured to be selectively attached to or removed from a second card body of the plurality of card bodies, by selectively engaging the attachment portion to a second receiving portion of the second card body or disengaging the attachment portion from the second receiving portion of the second card body, respectively, the second card body being different from the first card body.

12. The removable magnetic strip assembly of claim 11, further comprising:
   visible cardholder information printed on the reusable magnetic strip; wherein
   the visible cardholder information is configured to be removed from the first card body when the reusable magnetic strip is removed from the first card body, and configured to be attached to the second card body when the reusable magnetic strip is attached to the second card body.

13. The removable magnetic strip assembly of claim 10, wherein the attachment portion comprises a snap and a clasp.

14. The removable magnetic strip assembly of claim 10, wherein the attachment portion comprises a track.

15. The removable magnetic strip assembly of claim 10, wherein the attachment portion comprises at least one magnet.

16. The removable magnetic strip assembly of claim 10, wherein the tactile grip portion is formed of a same material as the magnetic strip.

17. A method, the method comprising:
   uncoupling a first removable magnetic strip assembly from a first card body having a first receiving portion, the first removable magnetic strip assembly including a first magnetic strip, a first attachment portion, and a first visible cardholder information printed on the first magnetic strip, wherein upon uncoupling of the first removable magnetic strip assembly, the first card body is disabled from active use as tender; and
   coupling the first removable magnetic strip assembly to a second card body such that, when coupled to the second card body, the second card body is enabled for active use as tender.

18. The method of claim 17, wherein coupling the first removable magnetic strip assembly to the second card body includes engaging the first attachment portion to a second receiving portion of the second card body.

19. The method of claim 17, the method further comprising:
   coupling a second removable magnetic strip assembly to the first card body, the second removable magnetic strip assembly including a second magnetic strip, a second attachment portion, and second visible cardholder information printed on the second magnetic strip.

20. The method of claim 19, wherein the first visible cardholder information is different from the second visible cardholder information.

* * * * *